United States Patent [19]
Martin

[11] Patent Number: 5,542,343
[45] Date of Patent: Aug. 6, 1996

[54] POWER STEERING ASSEMBLY WITH DAMPING RING

[75] Inventor: Jon W. Martin, Los Alamitos, Calif.

[73] Assignee: TRW Inc., Lyndhurst, Ohio

[21] Appl. No.: 534,077

[22] Filed: Sep. 26, 1995

[51] Int. Cl.⁶ .................................. F15B 9/10; B62D 5/06
[52] U.S. Cl. .................................. 91/375 R; 137/625.21; 180/441
[58] Field of Search .................. 91/375 R, 375 A; 137/625.21, 625.22, 625.23; 180/132, 146

[56] References Cited

U.S. PATENT DOCUMENTS

| | | |
|---|---|---|
| 3,058,321 | 10/1962 | Aske . |
| 3,096,106 | 7/1963 | Wanner . |
| 3,138,069 | 6/1964 | Bishop . |
| 3,859,821 | 1/1975 | Wallace . |
| 4,173,987 | 11/1979 | Kouda ............................. 91/375 A X |
| 4,667,530 | 5/1987 | Mettler et al. . |
| 4,905,782 | 3/1990 | Rieger et al. ..................... 91/375 A X |
| 5,213,174 | 5/1993 | Adams . |
| 5,272,933 | 12/1993 | Collier et al. ..................... 91/375 A X |
| 5,287,792 | 2/1994 | Betros et al. ...................... 91/375 R |

*Primary Examiner*—Hoang Nguyen
*Attorney, Agent, or Firm*—Tarolli, Sundheim, Covell, Tummino & Szabo

[57] ABSTRACT

A hydraulic power rack and pinion steering assembly (10) includes a valve core (98) and a valve sleeve (100) which are supported for relative rotation. A damping ring assembly (150) is interposed between the valve parts (98, 100) to reduce vibrations and thereby to attenuate noise. The damping ring assembly (150) includes an inner ring (160) press fit on the valve core (98) and an outer ring (170) press fit in the valve sleeve (100). An elastomeric member (180) is disposed in the annulus between the inner ring (160) and the outer ring (170). The elastomeric member (180) is bonded to the inner ring (160). Ribs (210–216) on the inner ring (170) are received in grooves (270–276) in the elastomeric member (180). The ribs (210–216) sequentially engage the elastomeric member (180) upon incremental relative rotation between the valve parts (98, 100) to provide a damping effect which changes at an increasing rate as the valve parts move from the centered condition.

15 Claims, 5 Drawing Sheets

5,542,343

POWER STEERING ASSEMBLY WITH DAMPING RING

BACKGROUND OF THE INVENTION

1. Technical Field

The present invention relates to a hydraulic power steering assembly for steering a vehicle and, particularly, to a damping ring assembly for attenuating noise caused by vibrations in a hydraulic power steering assembly.

2. Description of the Prior Art

Hydraulic power steering assemblies for steering a vehicle are known. One common type of hydraulic power steering assembly is a power assisted rack and pinion steering assembly having a housing which supports a rack for longitudinal movement to steer the vehicle. The housing contains a hydraulic control valve. The control valve responds to rotation of an input shaft connected with the vehicle steering wheel to regulate the flow of hydraulic fluid to a hydraulic cylinder containing a piston that moves the rack. The control valve includes a valve core and a valve sleeve which are supported for rotation relative to each other and which have surfaces which define hydraulic fluid flow paths through the valve assembly.

The pressurized flows of hydraulic fluid in the control valve can cause vibrations in the valve assembly in the nature of undesired oscillation between the valve core and the valve sleeve. The vibrations in the control valve can cause noises that are audible to an occupant of the vehicle. It is desirable to minimize undesired oscillation between the valve core and the valve sleeve, so as to minimize audible noise emanating from the steering gear.

SUMMARY OF THE INVENTION

The present invention is a hydraulic power steering apparatus comprising a rotatable input member, a rotatable output member, and a housing supporting the input member and the output member for rotation relative to each other about an axis. The apparatus includes a hydraulic valve comprising a valve core and a valve sleeve. The valve core is supported in the housing for rotation with the input member relative to the output member and to the valve sleeve. The valve sleeve is supported in the housing for rotation with the output member relative to the input member and to the valve core. The valve has a centered condition in which the valve core and the valve sleeve are in a predetermined first relative position.

The apparatus includes noise attenuating means for attenuating noise caused by vibrations of the valve core relative to the valve sleeve. The noise attenuating means comprises a damping ring assembly extending circumferentially between the valve core and the valve sleeve. The damping ring assembly comprises first and second tubular members which are spaced apart radially from each other and which define between them an annulus. Each one of the first and second tubular members is connected for rotation with a respective one of the valve core and the valve sleeve. A plurality of bearing members including at least first and second bearing members are disposed in the annulus and are connected for movement with the first tubular member. An elastomeric member is disposed in the annulus and is connected for movement with the second tubular member. The first bearing member is spaced apart from the elastomeric member by a first distance when the valve is in the centered condition. The second bearing member is spaced apart from the elastomeric member by a second distance greater than the first distance when the valve is in the centered condition. The first and second bearing members are sequentially engageable with the elastomeric member, upon movement of the valve from the centered condition, to transmit rotational force between the bearing member and the elastomeric member and thereby between the first and second tubular members.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
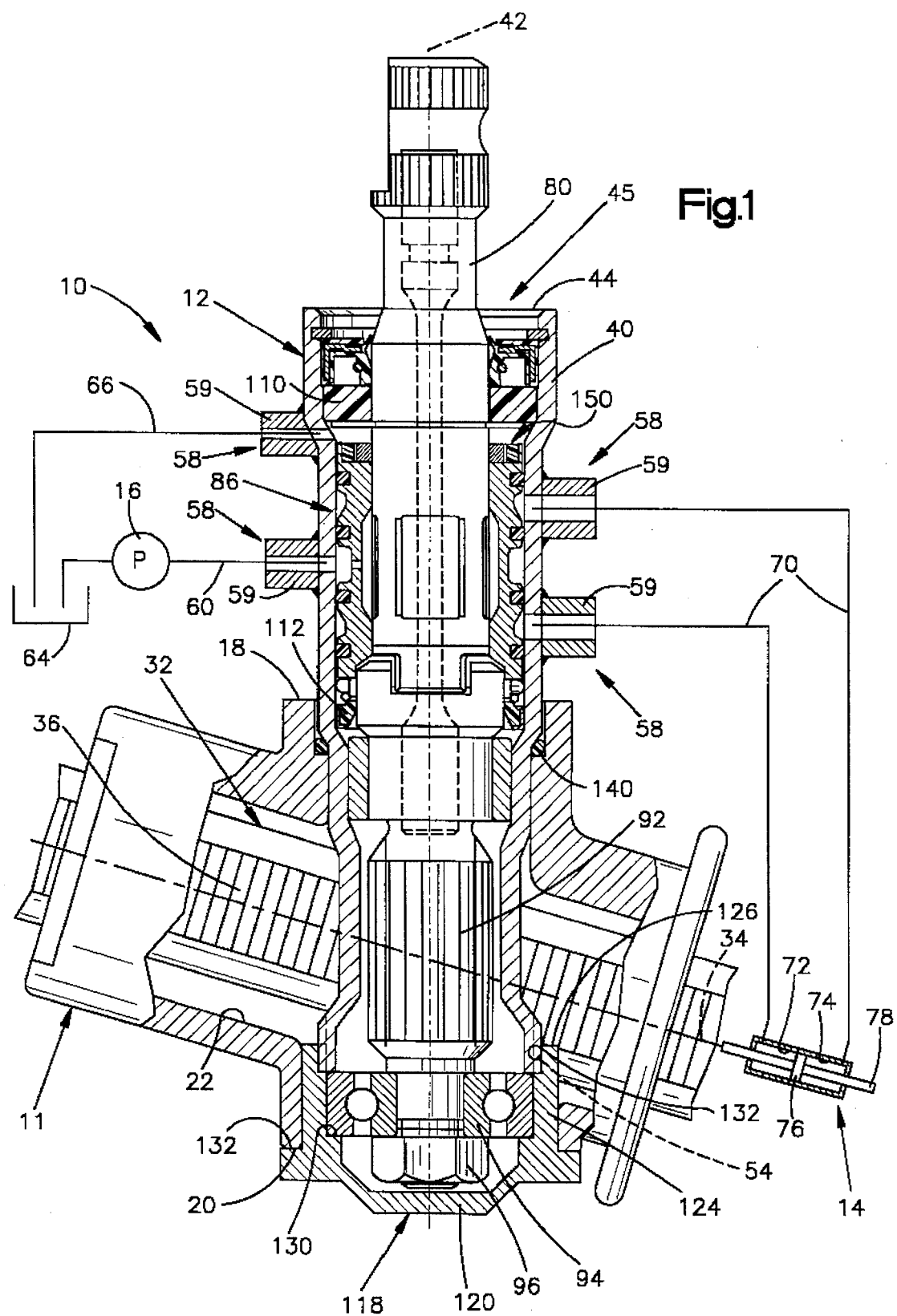
FIG. 1 is a sectional view of a hydraulic power assisted rack and pinion steering assembly in accordance with the present invention.

The present invention relates to a hydraulic power steering assembly for steering a vehicle. The present invention is applicable to various hydraulic power steering assembly constructions, including rack and pinion steering assemblies and worm gear steering assemblies. As representative of the present invention, FIG. 1 illustrates a hydraulic power assisted rack and pinion steering assembly 10. The steering assembly 10 is operable to turn the steerable wheels (not shown) of a vehicle to effect steering of the vehicle.

The steering assembly 10 includes a damping ring assembly 150, described below in detail. With the exception of the damping ring assembly 150, the steering assembly 10 is of the type shown in U.S. Pat. No. 5,213,174 and includes a rack housing 11 which supports an elongate rack 32 for movement along a longitudinal axis 34 of the rack. The rack 32 has a plurality of rack teeth 36. Opposite end portions (not shown) of the rack 32 are connected in a known manner by vehicle steering linkage to the steerable wheels of the vehicle.

The steering assembly 10 includes a control valve assembly 12. The control valve assembly 12 includes a cylindrical tubular steel member 40 having a longitudinal axis 42. The tubular steel member 40 has an annular upper surface 44 surrounding a circular upper opening 45 centered on the axis 42. An annular lower surface 46 surrounds a circular lower opening 47 also centered on the axis 42. The tubular steel member 40 has an outer surface 48 which includes an annular portion 50 at a location between the upper and lower ends of the tubular steel member 40.

The tubular steel member 40 includes ports 58 for conducting hydraulic fluid into and out of the tubular steel member. Each port 58 includes a flare nut 59 welded to the tubular steel member 40 over an associated aperture in the tubular steel member. The flare nuts 59 are for connecting hydraulic lines, shown schematically in FIG. 1, to the tubular steel member 40. A hydraulic supply line 60 connects a pump 16 and a hydraulic reservoir 64 with one port 58 in the tubular steel member 40. A hydraulic exhaust line 66 connects another port 58 with the reservoir 64. A pair of hydraulic lines 70 connect each one of a pair of ports 58 with respective working chambers 72 and 74 on opposite sides of a piston 76 in the hydraulic cylinder 14. A piston rod 78 is connected to the rack 32.

The control valve assembly 12 also includes an input shaft 80, a pinion 82, a torsion bar 84 and a control valve 86. The input shaft 80 is connected for rotation with a steering wheel (not shown) of the vehicle. The input shaft 80 is supported in the tubular steel member 40 for rotation about the axis 42 in response to rotation of the vehicle steering wheel. The input shaft 80 has a cylindrical outer surface in which four recesses 88 are defined by edges 90. The recesses 88 are centered at locations circumferentially spaced 90° apart about the axis 42.

The pinion 82 has an array of pinion teeth 92 which are in meshing engagement with the rack teeth 36 on the rack 32. The pinion 82 is supported in a bearing 94 for rotation about the axis 42. The bearing 94 is held in place against the annular lower surface 46 of the tubular steel member 40 by a nut 96 on the end of the pinion 82.

The torsion bar 84 extends along the axis 42 and connects the input shaft 80 with the pinion 82. The torsion bar 84 permits the input shaft 80 and the pinion 82 to rotate slightly relative to each other in response to a steering torque.

The control valve 86 includes a valve core 98. The valve core 98 is the portion of the input shaft 80 which includes the recesses 88 and the edges 90 on the input shaft. The cylindrical outer surface of the input shaft 80 thus forms a cylindrical outer surface of the valve core 98.

The control valve 86 also includes a cylindrical valve sleeve 100. The valve sleeve 100 is connected with the pinion 82 for rotation with the pinion relative to the valve core 98. The valve sleeve 100 has a cylindrical inner surface, adjoining the cylindrical outer surface of the valve core 98, in which are formed a plurality of recesses 102. An outer surface of the valve sleeve 100 has a plurality of annular grooves 104 and recesses 106.

Figure 3:
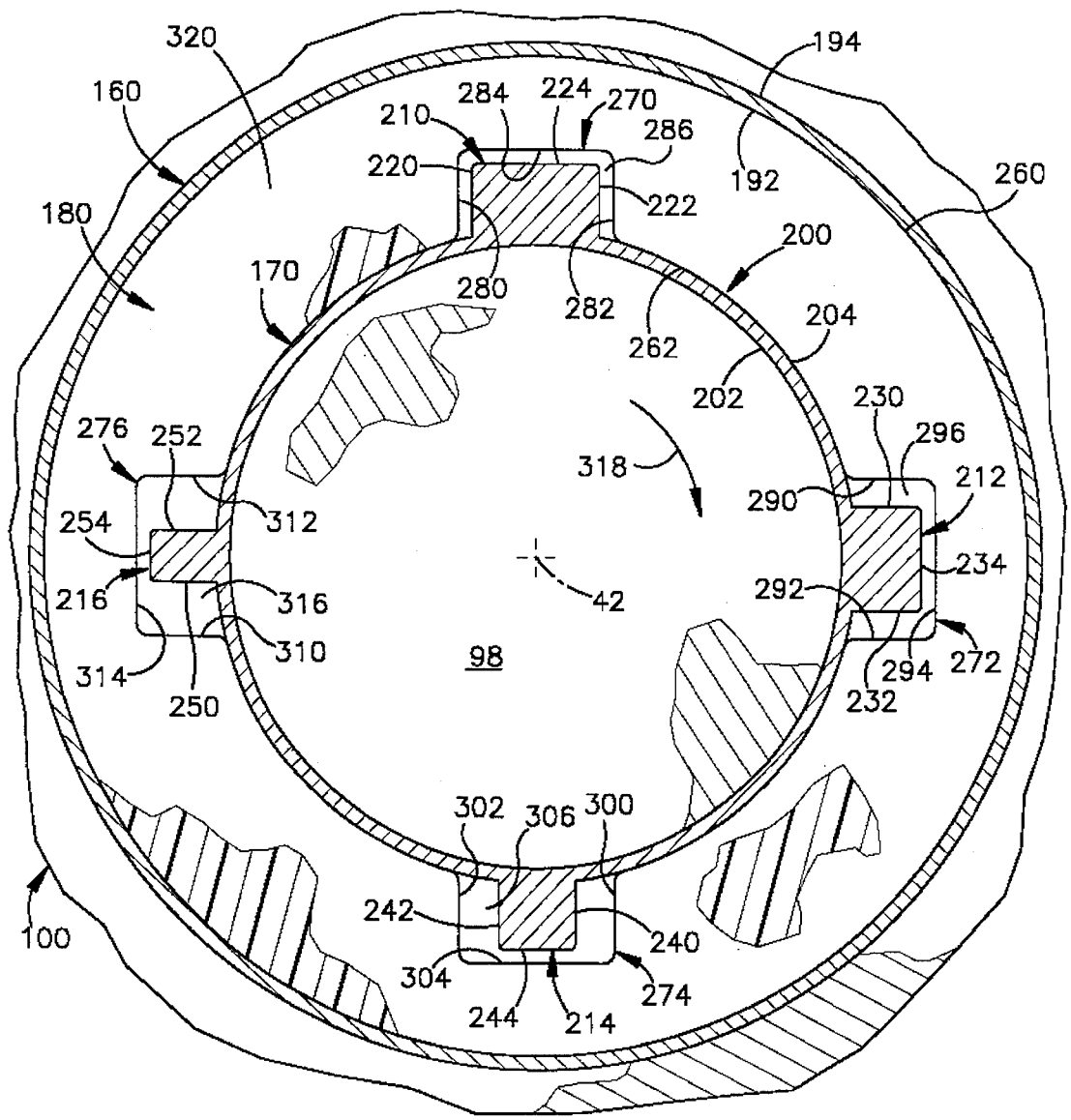
FIG. 3 is a radial sectional view of a damping ring assembly included in the steering assembly of FIG. 1, shown when the control valve is in a centered condition.

A plurality of O-ring seals 108, preferably formed of reinforced PTFE or from nylon are disposed in the grooves 104. The seals 108 block fluid flow between the recesses 106. A plurality of passages 109, one of which is shown in FIG. 3, interconnect certain recesses 106 at the outer surface of the valve sleeve 100 with certain recesses 102 at the inner surface of the valve sleeve 100. The passages 109, the recesses 106 and 102 on the valve sleeve 100, and the recesses 88 on the input shaft 80 thus define hydraulic fluid flow paths through the control valve 86 between the ports 58.

The control valve 86 is supported in the tubular steel member 40 in a chamber defined between an upper hydraulic seal 110 and a lower hydraulic seal 112. The upper and lower hydraulic seals 110 and 112 block the flow of hydraulic fluid from the chamber axially toward the upper and lower openings 45 and 47 in the tubular steel member 40. The upper and lower hydraulic seals 110 and 112 are preferably formed of hydrogenated nitrile butadiene rubber. A cap 118 secures the lower end (as viewed in FIG. 1) of the tubular steel member 40 in the rack housing 11.

When the input shaft 80 and the pinion 82 rotate relative to each other in response to a steering torque applied to the input shaft, the valve core 98 rotates relative to the valve sleeve 100. The recesses 88 on the input shaft 80 thus rotate relative to the recesses 102 on the inner surface of the valve sleeve 100. When the recesses 88 rotate relative to the recesses 102, the hydraulic fluid flow paths through the valve 86 are adjusted so that certain hydraulic fluid flow paths become relatively restricted and certain hydraulic fluid flow paths become relatively unrestricted. A pressurized flow of hydraulic fluid is thereby directed through the control valve 86 from the pump 16 to one side of the piston 76 in the hydraulic cylinder 14, and hydraulic fluid is exhausted from the other side of the piston 76 through the control valve 86 to the reservoir 64.

As an example, when a steering torque is applied to the input shaft 80 in a first rotational direction, a pressurized flow of hydraulic fluid is directed to the working chamber 72 on the left side (as viewed in FIG. 1) of the piston 76. The piston 76 and the piston rod 78 move to the right as viewed in FIG. 1. The rack 32 is moved longitudinally with the piston rod 78, to the right as viewed in FIG. 1, to effect a steering movement of the associated steerable vehicle wheels in a first direction. As the rack 32 moves with the piston rod 78, the pinion 80 is rotated by the moving rack 32 to cause follow-up rotational movement of the valve sleeve 100 relative to the valve core 98 on the input shaft 80. When the valve sleeve 100 is thus moved to a position in which it is no longer rotationally displaced from the valve core 98, the hydraulic fluid flow paths through the control valve 86 are in a re-adjusted position so as to stop longitudinal movement of the piston rod 78 and the rack 32, and to stop steering movement of the associated steerable vehicle wheels.

When a steering torque is applied to the input shaft 80 in a second rotational direction opposite to the first rotational direction, a pressurized flow of hydraulic fluid is directed to the working chamber 74 on the right side (as viewed in FIG. 1) of the piston 76. The piston 76 and the piston rod 78 move to the left as viewed in FIG. 1. The rack 32 is moved longitudinally with the piston rod 78 to the left as viewed in FIG. 1 to effect a steering movement of the associated steerable vehicle wheels in a second direction opposite to the first direction. Movement of the rack 32 to the left likewise causes follow-up rotational movement of the pinion 82 relative to the input shaft 80 to stop steering movement of the steerable wheels.

Figure 2:
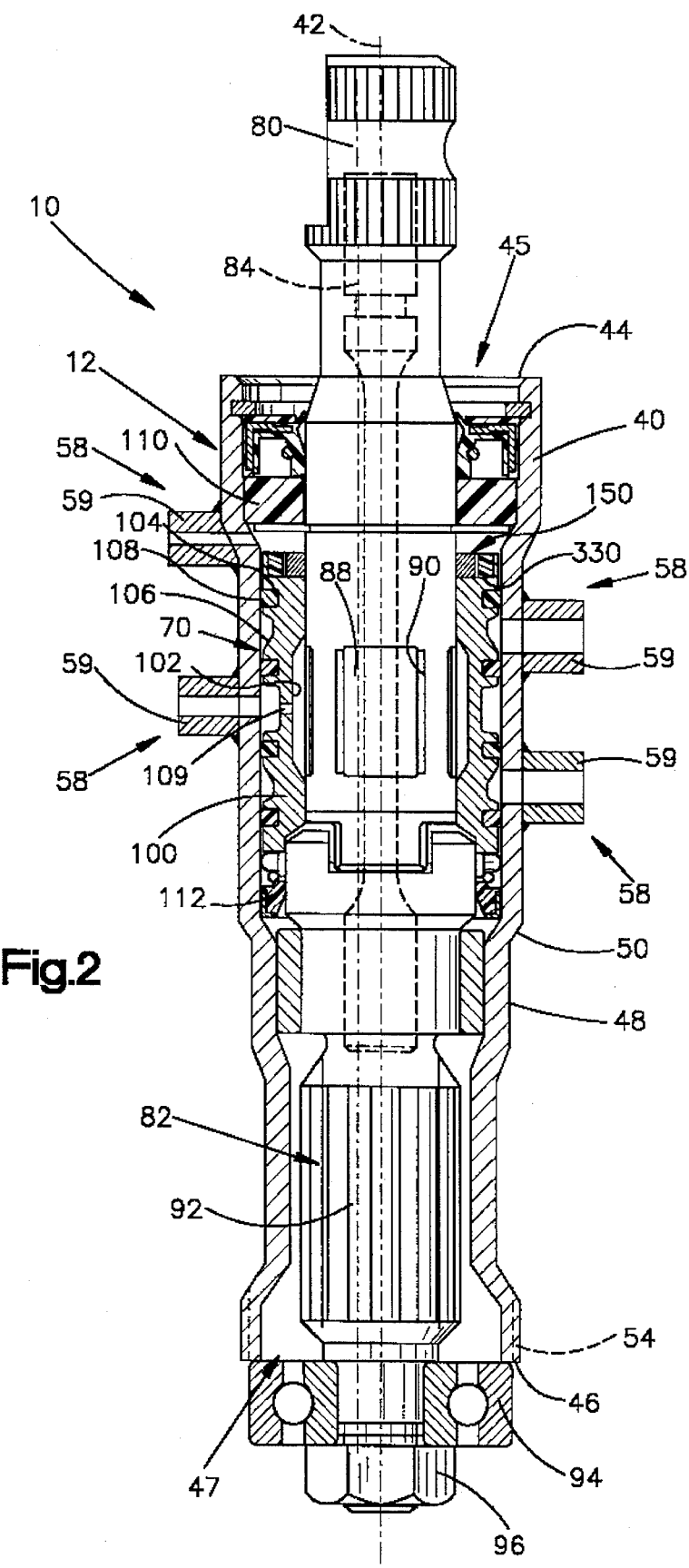
FIG. 2 is a sectional view of a part of the steering assembly of FIG. 1 including a hydraulic fluid control valve.

The damping ring assembly 150 (FIG. 3) includes an outer tubular member or outer ring 160, an inner tubular member or inner ring 170, and a damping member or elastomeric member 180. The outer ring 160, the inner ring 170, and the elastomeric member 180 are axially co-extensive over the length of (from top to bottom as viewed in FIG. 2) the damping ring assembly 150.

The outer ring 160 is an annular member made from carbon steel or stainless steel or another material which preferably matches the coefficient of thermal expansion of the valve sleeve 100. The outer ring 160 has parallel, axially extending cylindrical inner and outer side surfaces 192 and 194 centered on the axis 42.

The inner ring 170 is an annular member made from carbon steel or stainless steel or another suitable material preferably matching the coefficient of thermal expansion of the material of the input shaft 80. The inner ring 170 includes a cylindrical main body portion 200 which has parallel inner and outer side surfaces 202 and 204. Each of the side surfaces 202 and 204 has a cylindrical configuration and is centered on the axis 42.

The inner ring 170 includes a plurality of axially extending projections in the form of four ribs 210, 212, 214 and 216. The ribs 210–216 are formed as one piece with and are axially coextensive with the main body portion 200 of the inner ring 170. The ribs 210–216 project radially outward from the main body portion 200 of the inner ring 170, in a direction toward the outer ring 160. Each one of the ribs 210–216 has a generally rectangular cross-sectional configuration.

The first rib 210 (FIG. 3) has parallel, planar first and second side surfaces 220 and 222 which are connected by a planar outer end surface 224 extending parallel to the axis 42. The second rib 212 is spaced apart from the first rib 210 by about 90° around the circumference of the inner ring 170 in the direction indicated by the arrow 318 (FIG. 3). The second rib 212 has parallel, planar first and second side surfaces 230 and 232 which are connected by a planar outer end surface 234. The second rib 212 is smaller or narrower than the first rib 210. That is, the distance between the side surfaces 230 and 232 of the second rib 212 is less than the distance between the side surfaces 220 and 222 of the first rib 210.

The third rib 214 is spaced apart from the second rib 212 by about 90° around the circumference of the inner ring 170 in the direction indicated by the arrow 318. The third rib 214 has parallel, planar first and second side surfaces 240 and 242 which are connected by a planar outer end surface 244. The third rib 214 is smaller or narrower than the second rib 212. That is, the distance between the side surfaces 240 and 242 of the third rib 214 is less than the distance between the side surfaces 230 and 232 of the second rib 212.

The fourth rib 216 is spaced apart from the third rib 214 by about 90° around the circumference of the inner ring 170 in the direction indicated by the arrow 318. The fourth rib 216 has parallel, planar first and second side surfaces 250 and 252 which are connected by a planar outer end surface 254. The fourth rib 216 is smaller or narrower than the third rib 214. That is, the distance between the side surfaces 250 and 252 of the fourth rib 216 is less than the distance between the side surfaces 240 and 242 of the third rib 214.

The elastomeric member or damping member 180 has a generally annular configuration and is interposed between the inner ring 170 and the outer ring 160. The elastomeric member 180 is made from a material which is selected to withstand the high temperature and exposure to oil in the environment of the control valve 86. A preferred material for the elastomeric member 180 is hydrogenated nitrile butadiene rubber (HNBR). Alternative materials which are suitable for the elastomeric member 180 are nitrile butadiene rubber (NBR), neoprene, and fluorocarbon rubber. The elastomeric member 180 preferably has a very low degree of resilience so that it has a damping effect between the inner ring 170 and the outer ring 160.

The elastomeric member 180 (FIG. 3) has a cylindrical outer surface 260 which is in abutting engagement with and which is bonded to the cylindrical inner surface 192 of the outer ring 160. A cylindrical inner surface 262 of the elastomeric member 180 extends parallel to the outer surface 260 of the elastomeric member. The inner surface 262 of the elastomeric member 180 is disposed adjacent to, but is not bonded to, the outer surface 204 of the inner ring 170.

Four axially extending grooves 270, 272, 274, and 276 are formed on the inner side surface 262 of the elastomeric member 180. Each one of the grooves 270–276 has a generally rectangular cross-sectional configuration. The grooves 270–276 are the same size as each other. The grooves 270–276 project radially outward in a direction toward the outer ring 160 but do not extend completely to the outer ring 160.

The first groove 270 is defined by parallel, planar side surfaces 280 and 282 which are connected by an outer end surface 284. The first groove 240 receives the first rib 210 of the inner ring 170. The first groove 270 has a greater circumferential extent than the first rib 210. Thus, a circumferential gap 286 is formed between the outer side surfaces 220 and 224 of the first rib, and the inner side surfaces 280 and 282 of the first groove 270, when the control valve 86 is in the centered condition as shown in FIG. 3. When the control valve 86 is in the centered condition, the size of the gap 286 is the same on both sides (left and right as viewed in FIG. 3) of the first rib 210.

The second groove 272 is defined by parallel, planar side surfaces 290 and 292 which are connected by a planar outer end surface 294. The second groove 272 receives the second rib 212 of the inner ring 170. The second groove 272 has a greater circumferential extent than the second rib 212. Thus, a circumferential gap 296 is formed between the outer side surfaces 230 and 232 of the second rib 212 and the inner side surfaces 290 and 294 of the second groove 272 when the control valve 86 is in the centered condition shown in FIG. 3. When the control valve 86 is in the centered condition, the size of the gap 296 is the same on both sides (top and bottom as viewed in FIG. 3) of the second rib 212. Because the second rib 212 is narrower than the first rib 210, the circumferential extent of the gap 296 adjoining the side surfaces 230 and 232 of the second rib 212 is greater than the circumferential extent of the gap 286 on the sides of the first rib 210.

The third groove 274 is defined by parallel, planar side surfaces 300 and 302 which are connected by a planar outer end surface 304. The third groove 274 receives the third groove 214 of the inner ring 170. The third groove 274 has a greater circumferential extent than the third rib 214. Thus, a circumferential gap 306 is formed between the outer side surfaces 240 and 242 of the third rib 214 and the inner side surfaces 300 and 302 of the third groove 274, when the control valve 86 is in the centered condition shown in FIG. 3. When the control valve 86 is in the centered condition, the circumferential extent of the circumferential gap 306 is the same on both sides 240 and 242 of the third rib 214. Because the third rib 214 is narrower than the second rib 212, the circumferential extent of the gap on the sides of the third rib is larger than the circumferential extent of the gap on the sides of the second rib.

The fourth groove 276 is defined by parallel, planar side surfaces 310 and 312 which are connected by a planar outer end surface 314. The fourth groove 276 receives the fourth rib 216 of the inner ring 170. The fourth groove 276 has a greater circumferential extent than the fourth rib 216. Thus, a gap 316 is formed between the outer side surfaces 250 and 252 of the fourth rib 216 and the inner side surfaces 310 and 312 of the fourth groove 276. When the control valve 86 is in the centered condition, the circumferential extent of the gap 316 is the same on both sides of the fourth rib 216. Because the fourth rib 216 is narrower than the third rib 214, the circumferential extent of the gap 316 on the sides 250 and 252 of the fourth rib is larger than the circumferential extent of the gap 306 on the sides of the third rib.

The actual dimensions of the gaps 286, 296, 306 and 316 around the ribs 210–216 are selected and are predetermined in accordance with the desired operating characteristics of the steering assembly 10. The size of the gaps 286, 296, 306 and 316 determines the amount of relative rotation which is possible between the inner ring 170 and the outer ring 160 prior to engagement between the inner ring and the elastomeric member 180, as described below.

The cylindrical inner surface 192 of the outer ring 160 and the cylindrical outer surface 204 of the inner ring 170 define between them an annulus 320. The elastomeric member 180 substantially fills the annulus 320. The ribs 210–216 project or protrude into the annulus 320. During the process of molding the elastomeric member 180, the outer ring 160 is bonded or otherwise secured to the elastomeric member to prevent relative movement between the outer ring and the elastomeric member. A curable adhesive is preferably used where bonding is desired. The inner ring 170 is not bonded to the elastomeric member 180. A release agent may be used in areas where bonding is not desired.

During manufacture of the steering assembly 10, the damping ring assembly 150 is placed in an annular groove 330 (FIG. 3) in the axial end face of the valve sleeve 100. The outer ring 160 has a press fit in the valve sleeve 100. The outer side surface 194 of the outer ring 160 is in abutting engagement with a cylindrical inner surface of the valve sleeve 100.

The damping ring assembly 150, when in the groove 330 in the valve sleeve 100, encircles the valve core 98 on the input shaft 80. The inner ring 170 has a press fit on the valve core 98. The inner surface 202 of the inner ring 170 is in abutting engagement with a cylindrical outer surface of the valve core 98.

As a result, the outer ring 160 of the damping ring assembly 150 is connected for rotation with the valve sleeve 100. The inner ring 170 of the damping ring assembly 150 is connected for rotation with the valve core 98. The elastomeric member 180, which is bonded to the outer ring 160, is connected for movement with the outer ring and is disposed between the outer ring and the inner ring 170.

In operation of the steering assembly 10, hydraulic fluid under pressure is directed through the control valve 86 to cause relative rotation of the valve core 98 and the valve sleeve 100 in the manner described above. In the illustrated power steering assembly 10, the valve core 98 and the valve sleeve 100 are rotatable up to approximately three to six degrees in either direction of rotation from the centered condition shown in FIG. 3.

When the control valve 86 first opens, that is, upon relative rotation between the valve core 98 and the valve sleeve 100 in an amount of up to about one-half degree to one degree, the high pressure fluid flowing through the small passages in the control valve can cause the valve core and the valve sleeve to "chatter", that is, to oscillate rapidly relative to each other. This movement results in relative rotation between the outer ring 160 of the damping assembly 150, which is connected for movement with the valve sleeve 100, and the inner ring 170, which is connected for movement with the valve core 98.

Figure 4:
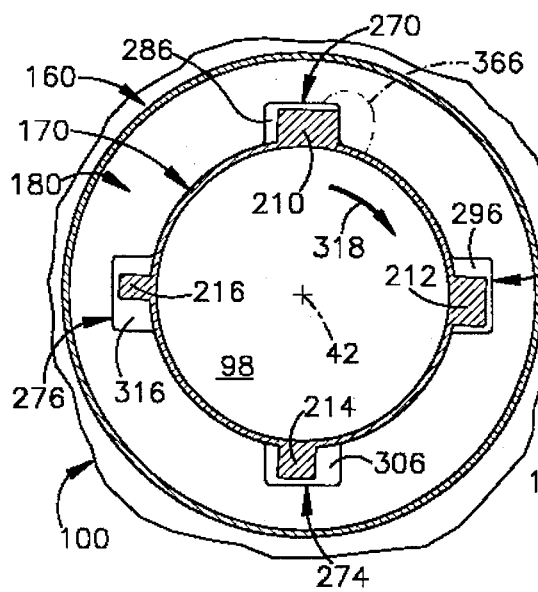
FIGS. 4–7 are a series of views similar to FIG. 3 showing the damping ring assembly when the control valve is turned from the centered condition.

Relative rotational movement between the outer ring 160 and the inner ring 170 can be resisted by the elastomeric member 180. After about one-half degree to about one degree of relative rotation between the outer ring 160 and the inner ring 170, such as in the direction indicated by the arrow 318 in FIG. 4, the gap 286 around the first rib 210 closes on one side of the first rib as seen in FIG. 4. Specifically, one of the side surfaces on the elastomeric member 180, such as the side surface 282 (FIG. 3), engages the adjacent side surface on the first rib 210 of the inner ring 170, such as the side surface 222. The elastomeric member 180 (FIG. 4) is thus in a force-transmitting relationship with the inner ring 170. As a result, the outer ring 160, which is connected for movement with the elastomeric member 180, is in a force-transmitting relationship with the inner ring 170.

Further relative rotation between the inner ring 170 and the outer ring 160 is at least partially damped by the material of the elastomeric member 180. The material of the elastomeric member 180 is distorted, or deformed in shear, upon further relative rotation between the inner ring 170 and the outer ring 160. The force on the elastomeric member 100 is distributed through the entire body of the elastomeric member. The amount of distortion of the elastomeric member 180 resulting from the force applied to the elastomeric member decreases at locations farther from the area of contact between the first rib 210 and the elastomeric member. Thus, the greatest amount of distortion occurs adjacent to the first rib 210, generally in the portion of the elastomeric member designated schematically by the dashed lines 366 in FIG. 4.

Some of the energy of the relative motion between the inner ring 170 and the outer ring 160 is dissipated by the damping ring assembly 150 through friction and heat generation induced through shear deformation (distortion) of the elastomeric member 180. The energy that is dissipated by the damping ring assembly 150 in this manner is not transmitted between the valve core 98 and the valve sleeve 100. The energy that is dissipated by the damping ring assembly 150 would otherwise be expended through undesired relative rotation between the valve sleeve 100 and the valve core 98. The damping ring assembly 150, by damping vibrations (relative rotation) of the valve core 98 relative to the valve sleeve 100, thus attenuates noise in the steering assembly 10.

The size of the gap 286 around the first rib 210 is such that the elastomeric member 180 does not engage the first rib until about one-half degree to about one degree of relative rotation between the valve core 98 and the valve sleeve 100 from the centered condition. During this initial range of turning movement of the steering assembly 10 from the centered condition, the damping ring assembly 150 does not resist or damp relative rotation of the valve core 98 and the valve sleeve 100. Accordingly, when the steering assembly 10 is in or is close to the centered condition, the damping ring assembly 150 does not affect the relationship between the driver input to the steering assembly and the amount of power assistance provided by the steering assembly.

Figure 5:
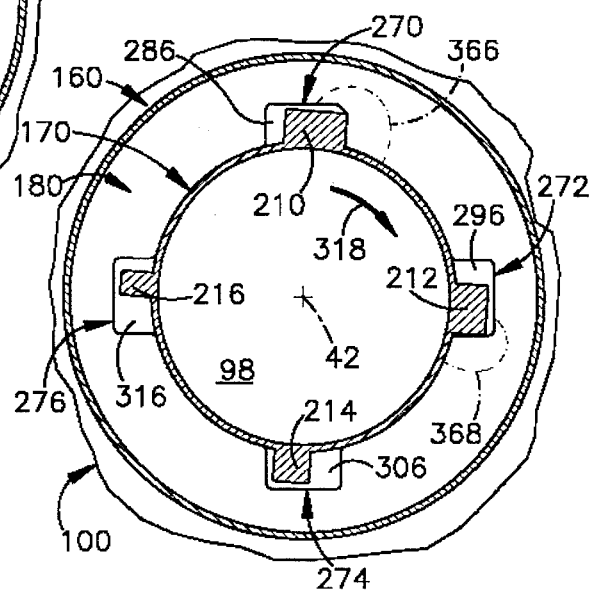

During continued relative rotation between the valve core 98 and the valve sleeve 100, the inner ring 170 rotates relative to the outer ring 160, from the position shown in FIG. 4 toward the position shown in FIG. 5. The first rib 210 remains in engagement with the elastomeric member 180. The elastomeric member 180 including the portion 366 is stressed and further deformed (distorted) in a greater amount as the change in condition of the control valve 86 puts more work into the elastomeric member. The amount of distortion of the elastomeric member 180 increases gradually at a first rate as the inner ring 170 rotates relative to the outer ring 160 from the position shown in FIG. 4 toward the position shown in FIG. 5. The increased distortion of the elastomeric member 180 results in increased dissipation of energy by the elastomeric member. Thus, the amount of damping provided by the damping ring assembly 150, resulting from the engagement of the first rib 210 with the elastomeric member 180, increases gradually at the first rate as the parts of the damping ring assembly move from the position shown in FIG. 4 toward the position shown in FIG. 5.

Sufficient further relative rotation between the valve core 98 and the valve sleeve 100, and thus between the inner ring 170 and the outer ring 160, causes the elastomeric member 180 to engage (or to be engaged by) the second rib 212 on the inner ring, as seen in FIG. 5. Specifically, one of the side surfaces defining the second groove 272 in the elastomeric member 180, such as the side surface 292 (FIG. 3), engages the adjacent side surface on the second rib 212 of the inner ring 170, such as the side surface 232. The gap 296 around the second rib 212 closes. The parts of the damping ring assembly 150 are in the position shown in FIG. 5.

When the second rib 212 engages the elastomeric member 180, the force-transmitting relationship between the elastomeric member and the inner ring 170 changes substantially rather than gradually, that is, in a stair-step manner. The force of the relative rotation between the inner ring 170 and the outer ring 160 is transmitted to the elastomeric member 180 not only through the first rib 210 but also through the second rib 212. At least a second portion of the elastomeric member 180, adjacent to the second rib 212 and designated schematically by the dashed lines 368 in FIG. 5, is distorted significantly, that is, is deformed in shear. The first portion 366 of the elastomeric member 180 also continues to be deformed by the first rib 210. Therefore, when both the first rib 210 and the second rib 212 are in engagement with the elastomeric member 180, the amount of resistance to rotation of the outer ring 160 relative to the inner ring 170 is significantly greater than the amount of resistance to rotation when only the first rib is in engagement with the elastomeric member.

Figure 6:
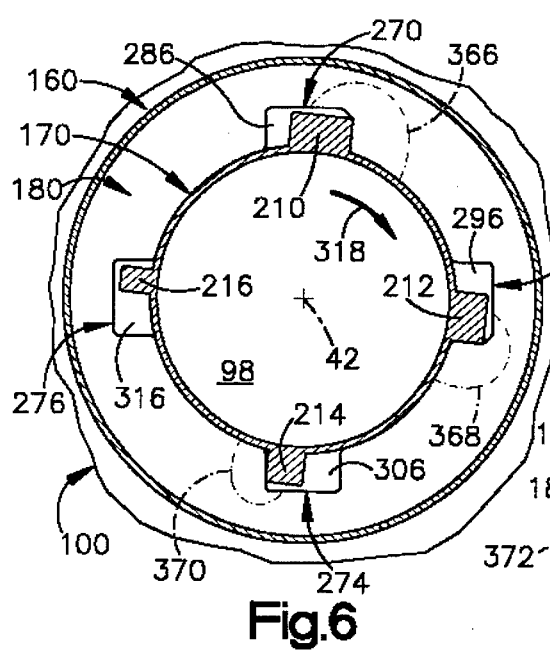

While the first and second ribs 210 remain in engagement with the elastomeric member 180, and upon further rotational movement of the inner ring 170 relative to the outer ring 160 from the position shown in FIG. 5 toward the position shown in FIG. 6, the elastomeric member including the portions 366 and 368 continues to be further stressed and further deformed. The amount of distortion of the elastomeric member 180 increases gradually, at a second rate, as the inner ring 170 rotates relative to the outer ring 160 from the position shown in FIG. 5 toward the position shown in FIG. 6. The increased distortion of the elastomeric member 180 results in increased dissipation of energy by the elastomeric member. Thus, the total amount of damping provided by the damping ring assembly 150, resulting from the engagement of the ribs 210 and 212 with the elastomeric member 180, increases gradually at the second rate, which is greater than the first rate, as the parts of the damping ring assembly move from the position shown in FIG. 5 toward the position shown in FIG. 6.

Specifically, the amount of damping resulting from the engagement of the first rib 210 with the elastomeric member 180 continues to increase as the parts of the damping ring assembly 150 move from the position shown in FIG. 5 to the position shown in FIG. 6. The amount of damping resulting from the engagement of the second rib 212 with the elastomeric member 180 also increases as the parts of the damping ring assembly 150 move from the position shown in FIG. 5 toward the position shown in FIG. 6. Therefore, the rate of increase of the amount of damping provided by the damping ring assembly 150, when both the first and second ribs 210 and 212 are in engagement with the elastomeric member 180, is greater than the rate of increase which occurs when only the first rib 210 is in engagement with the elastomeric member. Accordingly, it can be seen that the rate of increase of the amount of damping provided by the damping ring assembly 150 during the increment of relative rotation of the valve core 98 and the valve sleeve 100 from the position shown in FIG. 5 toward the position shown in FIG. 6 is greater than the rate of increase during the increment of relative rotation of the valve core 98 and the valve sleeve 100 from the position shown in FIG. 4 toward the position shown in FIG. 5.

Upon still further relative rotation between the inner ring 170 and the outer ring 160, into the position shown in FIG. 6, and while the first rib 210 and the second rib 212 remain in engagement with the elastomeric member 180, the elastomeric member engages (or is engaged by) the third rib 214 on the inner ring as seen in FIG. 6. The amount of damping provided by the elastomeric member 180 again increases significantly rather than gradually, in a stair-step manner. Specifically, one of the side surfaces defining the third groove 274 in the elastomeric member 180, such as the side surface 302 (FIG. 3), engages the corresponding side surface on the third rib 200 of the inner ring 170, such as the side surface 242. The circumferential gap 306 around the third rib 214 closes.

Figure 7:
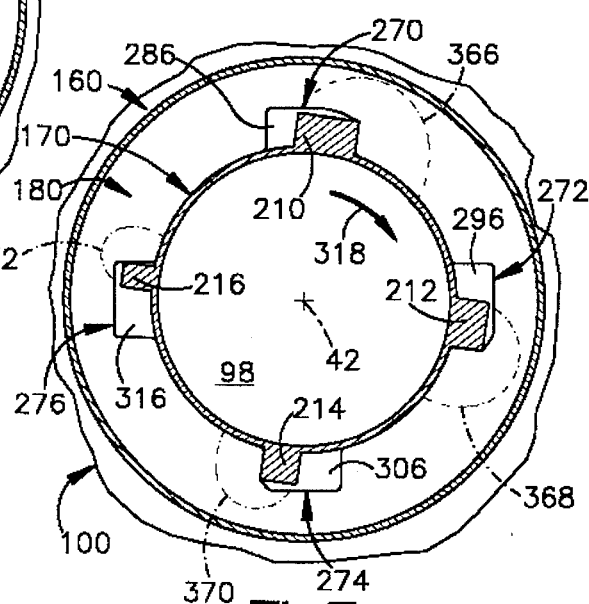

As a result of the engagement of the third rib 214 with the elastomeric member 180, at least a third portion of the elastomeric member 180, designated schematically by the dashed lines 370 in FIG. 7, is significantly deformed in shear. The first and second portions 366 and 368 of the elastomeric member also continue to be stressed significantly by the first and second ribs 210 and 212, respectively. As a result, the amount of resistance to relative rotation between the outer ring 160 and the inner ring 170 upon engagement of the third rib 214 with the elastomeric member 180 is significantly greater than the amount of resistance to rotation when only the first and second ribs 210 and 212 are in engagement with the elastomeric member.

While the three ribs 210–214 remain in engagement with the elastomeric member 180, and upon further relative rotation between the inner ring 170 and the outer ring 160 from the position shown in FIG. 6 toward the position shown in FIG. 7, the portions 366–370 of the elastomeric member continue to be further stressed and further deformed. The amount of distortion of the elastomeric member 180 increases as the inner ring 170 rotates relative to the outer ring 160 from the position shown in FIG. 6 toward the position shown in FIG. 7. The increased distortion of the elastomeric member 180 results in increased dissipation of energy by the elastomeric member. Thus, the total amount of damping provided by the damping ring assembly 150, resulting from the engagement of the three ribs 210–214 with the elastomeric member 180, increases at a third rate, greater than the second rate, as the parts of the damping ring assembly move from the position shown in FIG. 6 toward the position shown in FIG. 7.

Specifically, the amount of damping resulting from the engagement of the first rib 200 with the elastomeric member 180 continues to increase as the parts of the damping ring assembly move from the position shown in FIG. 6 toward the position shown in FIG. 7. The amount of damping resulting from the engagement of the second rib 212 with the elastomeric member 180 also increases as the parts of the damping ring assembly move from the position shown in FIG. 6 toward the position shown in FIG. 7. The amount of damping resulting from the engagement of the third rib 214 with the elastomeric member 180 also increases as the parts of the damping ring assembly move from the position shown in FIG. 6 toward the position shown in FIG. 7.

The rate of increase of the amount of damping provided by the damping ring assembly 150, when the first and second and third ribs 210–214 are in engagement with the elastomeric member 180, is greater than the rate of increase which occurs when only the first and second ribs 210 and 212 are in engagement with the elastomeric member. Accordingly, it can be seen that the rate of increase of the amount of damping provided by the damping ring assembly 150, during the increment of relative rotation between the valve core 98 and the valve sleeve 100 from the position shown in FIG. 6 toward the position shown in FIG. 7, is greater than the rate of increase during the increment of relative rotation between the valve core 98 and the valve sleeve 100 from the position shown in FIG. 5 toward the position shown in FIG. 6.

Upon still further relative rotation between the inner ring 170 and to the outer ring 160, while the ribs 210, 212 and 214 remain in engagement with the elastomeric member 180, the elastomeric member engages (or is engaged by) the fourth rib 216 on the inner ring as seen in FIG. 7. Specifically, one of the side surfaces defining the fourth groove 276 on the elastomeric member 180, such as the side surface 312 (FIG. 3), engages the corresponding side surface on the fourth rib 216 of the inner ring 170, such as the side surface 252. The gap 316 around the fourth rib 216 closes.

As a result of the engagement of the fourth rib 216 with the elastomeric member 180, at least a fourth portion of the elastomeric member 180, designated generally by the dashed lines 372 in FIG. 7, is significantly deformed in shear. The portions 366–370 of the elastomeric member 180 also continue to be stressed and distorted significantly by the ribs 210, 212 and 214, respectively. As a result, the amount of force which resists relative rotation between the outer ring 160 and the inner ring 170 increases significantly rather than gradually, in a stair-step manner, upon engagement of the fourth rib 216 with the elastomeric member 180, as compared to the amount of force which resists such rotation when only the first three ribs 210–214 are in engagement with the elastomeric member.

It should be understood that the ribs and grooves shown in the drawings are not necessarily drawn to scale and are not necessarily dimensioned in accordance with the requirements of an actual operating steering assembly 10. The relative sizes, numbers, and positions of the ribs and grooves can be tailored to provide the desired amount of damping and steering feel.

As an example, in one damping ring assembly 150 which has been constructed in accordance with the present invention, and for a valve core 98 having a diameter of about 25 mm (about one inch), gaps 286, 296, 306 and 316 which range from about 0.15 mm (0.006 inch) to about 0.45 mm (0.019 inch) may be appropriate to provide the desired steering feel and amount of damping. The first rib 210 in the one damping ring assembly 150 is about 3.7 mm wide and is disposed in a first groove 270 having a width of about 4.0 mm. As a result, the first rib 210 engages the elastomeric member 180 after about 0.15 mm of relative rotational movement, that is, after about 1° of relative rotation between the valve core 98 and the valve sleeve 100.

The second rib 212 is about 3.5 mm wide and is disposed in a second groove 272 having a width of about 4.0 mm. As a result, the second rib 212 engages the elastomeric member 180 after about 0.25 mm of relative rotational movement, that is, after about 1.3° of relative rotation between the valve core 98 and the valve sleeve 100.

The third rib 214 is about 3.3 mm wide and is disposed in a third groove 274 having a width of about 4.0 mm. As a result, the third rib 214 engages the elastomeric member 180 after about 0.35 mm of relative rotational movement, that is, after about 2° of relative rotation between the valve core 98 and the valve sleeve 100.

The fourth rib 216 is about 3.1 mm wide and is disposed in a fourth groove 276 having a width of about 4.0 mm. As a result, the fourth rib 216 engages the elastomeric member 180 after about 0.45 mm of relative rotational movement, that is, after about 2.7° of relative rotation between the valve core 98 and the valve sleeve 100.

Figure 8:
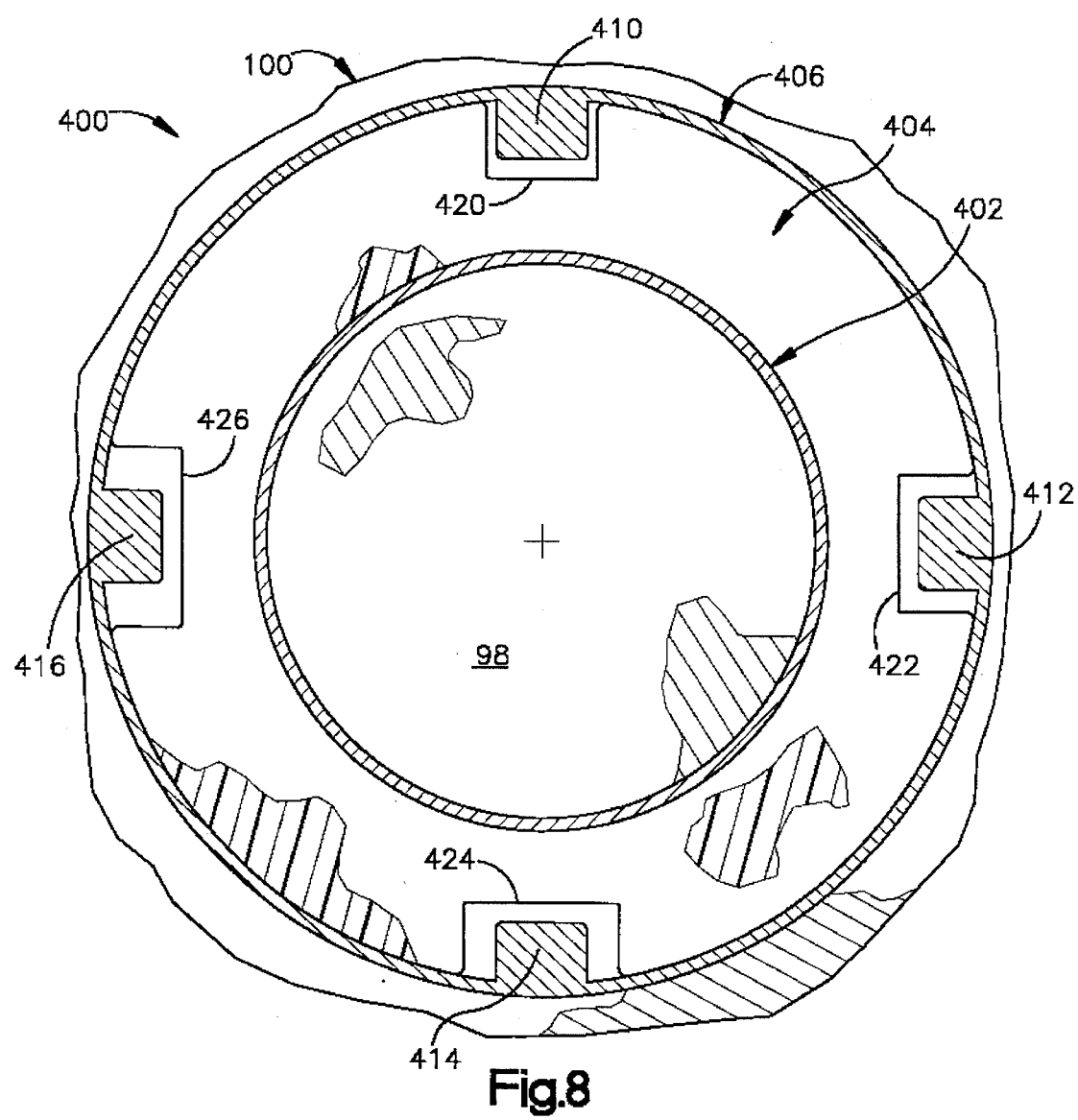
FIG. 8 is a view similar to FIG. 3 showing a damping ring assembly which is constructed in accordance with a second embodiment of the present invention.

FIG. 8 illustrates a damping ring assembly 400 which is constructed in accordance with a second embodiment of the present invention. The damping ring assembly 400 is generally similar to the damping ring assembly 150 (FIGS. 1–7), with the exceptions that (i) the ribs are formed on the outer ring rather than on the inner ring and (ii) the ribs are the same size as each other while the grooves differ in size from each other.

Specifically, the damping ring assembly 400 includes an inner ring 402, an elastomeric member 404, and an outer ring 406. The inner ring 402 is press fit on the valve core 98. The elastomeric member 404 is bonded to the inner ring 402 and is thus connected for movement with the inner ring.

The outer ring 406 is press fit in the valve sleeve 100. A plurality of ribs 410, 412, 414 and 416 are formed on the outer ring 406. The ribs 410–416 project radially inward in a direction toward the inner ring 402. The ribs 410–416 are received in corresponding grooves 420, 422, 424 and 426 in the elastomeric member 404.

Relative rotation between the valve core 98 and the valve sleeve 100 results in relative rotation between the inner ring 402 and the outer ring 406. The ribs 410–416 on the outer ring sequentially and incrementally engage the elastomeric member 404, in a manner similar to the engagement of the ribs 210–216 (FIGS. 1–7) on the inner ring 170 with the elastomeric member 180. Accordingly, the damping ring assembly 400 (FIG. 8) damps relative rotation between the valve core 98 and the valve sleeve 100.

From the above description of the invention, those skilled in the art will perceive improvements, changes and modifications in the invention. For example, the projecting portions or bearing members need not be in the shape of the illustrated ribs but could be in any other suitable shape. Such improvements, changes and modifications within the skill of the art are intended to be covered by the appended claims.

Having described the invention, I claim:

1. A hydraulic power steering apparatus comprising:

a rotatable input member;

a rotatable output member;

a housing supporting said input member and said output member for rotation relative to each other about an axis;

a hydraulic valve comprising a valve core and a valve sleeve;

said valve core being supported in said housing for rotation with said input member relative to said output member and to said valve sleeve;

said valve sleeve being supported in said housing for rotation with said output member relative to said input member and to said valve core;

said valve having a centered condition in which said valve core and said valve sleeve are in a predetermined first relative position;

said apparatus further comprising noise attenuating means for attenuating noise caused by vibrations of said valve core relative to said valve sleeve, said noise attenuating means comprising a damping ring assembly extending circumferentially between said valve core and said valve sleeve;

said damping ring assembly comprising first and second tubular members which are spaced apart radially from each other and which define between them an annulus, each one of said first and second tubular members being connected for rotation with a respective one of said valve core and said valve sleeve;

said damping ring assembly further comprising a damping member disposed in said annulus and connected between said first and second tubular members for damping relative movement between said first and second tubular members; and said damping ring assembly further comprising means for sequentially increasing the rate of change of the amount of damping provided by said damping member in response to increased movement of said valve from the centered condition.

2. An apparatus as set forth in claim 1 wherein said means for sequentially increasing the rate of change comprises:

a first bearing member fixed for rotation with said first tubular member and engageable with said elastomeric member upon a first increment of movement of said valve core relative to said valve sleeve; and a second bearing member fixed for rotation with said first tubular member and engageable with said elastomeric member upon a second increment of movement of said valve core relative to said valve sleeve.

3. An apparatus as set forth in claim 2 wherein said first bearing member is disposed in a first recess in said elastomeric member and said second bearing member is disposed in a second recess in said elastomeric member, said first recess having the same circumferential extent as said second recess, said first bearing member having a larger circumferential extent than said second bearing member.

4. An apparatus as set forth in claim 2 wherein said first bearing member is disposed in a first recess in said elastomeric member and said second bearing member is disposed in a second recess in said elastomeric member, said first bearing member having the same circumferential extent as said second bearing member, said first recess having a smaller circumferential extent than said second recess.

5. An apparatus as set forth in claim 1 wherein said valve core and said valve sleeve are relatively rotatable through a series of predetermined incremental positions when said valve is moved from the centered condition, said means for sequentially increasing the rate of change comprising means for incrementally increasing the amount of force transmitted between said valve sleeve and said valve core by said damping member in response to each additional increment of movement of said valve core relative to said valve sleeve.

6. A hydraulic power steering apparatus comprising:

a rotatable input member;

a rotatable output member;

a housing supporting said input member and said output member for rotation relative to each other about an axis;

a hydraulic valve comprising a valve core and a valve sleeve;

said valve core being supported in said housing for rotation with said input member relative to said output member and to said valve sleeve;

said valve sleeve being supported in said housing for rotation with said output member relative to said input member and to said valve core;

said valve having a centered condition in which said valve core and said valve sleeve are in a centered condition; and said apparatus comprising noise attenuating means for attenuating noise caused by vibrations of said valve core relative to said valve sleeve, said noise attenuating means comprising a damping ring assembly extending between said valve core and said valve sleeve;

said damping ring assembly comprising first and second tubular members which are spaced apart radially from each other and which define between them an annulus, each one of said first and second tubular members being connected for rotation with a respective one of said valve core and said valve sleeve;

said damping ring assembly further comprising a plurality of bearing members including at least first and second bearing members which are disposed in said annulus and which are connected for movement with said first tubular member;

said damping ring assembly further comprising an elastomeric member which is disposed in said annulus and which is connected for movement with said second tubular member;

said first bearing member being spaced apart from said elastomeric member by a first distance when said valve is in the centered condition;

said second bearing member being spaced apart from said elastomeric member by a second distance greater than said first distance when said valve is in the centered condition;

said first and second bearing members being sequentially engageable with said elastomeric member, upon movement of said valve from the centered condition, to transmit rotational force between said bearing members and said elastomeric member and thereby between said first and second tubular members.

7. An apparatus as set forth in claim 6 wherein said first tubular member comprises a metal ring having an annular main body portion, each one of said bearing members comprising a projection projecting from said main body portion in a direction toward said second tubular member.

8. An apparatus as set forth in claim 7 wherein each one of said bearing members comprises a rib formed on said first tubular member and projecting radially toward said second tubular member, each one of said ribs being received in a respective groove formed in said elastomeric member, said first tubular member and said elastomeric member defining a circumferential gap on opposite sides of each one of said ribs when said valve is in the centered condition.

9. An apparatus as set forth in claim 6 wherein said first bearing member is engageable with said elastomeric member in response to a first amount of relative rotation between said valve core and said valve sleeve when said valve moves in a first direction from the centered condition to a first non-centered condition, said second bearing member being engageable with said elastomeric member in response to a second amount of relative rotation between said valve core and said valve sleeve when said valve moves in the first direction from the first non-centered condition to a second non-centered condition, said first bearing member remaining in engagement with said elastomeric member during movement of said valve from the first non-centered condition to the second non-centered condition.

10. An apparatus as set forth in claim 6 wherein said first bearing member is disposed in a first recess in said elastomeric member and said second bearing member is disposed in a second recess in said elastomeric member, said first recess having the same circumferential extent as said second recess, said first bearing member having a larger circumferential extent than said second bearing member.

11. An apparatus as set forth in claim 6 wherein said first bearing member is disposed in a first recess in said elastomeric member and said second bearing member is disposed in a second recess in said elastomeric member, said first bearing member having the same circumferential extent as said second bearing member, said first recess having a smaller circumferential extent than said second recess.

12. An apparatus as set forth in claim 6 wherein the rate of change of the amount of damping provided by said damping member increases sequentially in response to increased movement of said valve from the centered condition.

13. An apparatus as set forth in claim 12 wherein said valve core and said valve sleeve are relatively rotatable through a series of predetermined incremental positions upon movement of said valve from the centered condition, the rate of change of the amount of damping provided by said damping member increasing in a stair-step manner in response to each additional increment of relative rotation between said valve core and said valve sleeve.

14. An apparatus as set forth in claim 13 wherein said predetermined incremental positions of relative rotation of said valve core and said valve sleeve correspond to positions of sequential, additive engagement between said bearing members and said elastomeric member.

15. A hydraulic power steering apparatus as set forth in claim 6 wherein said elastomeric member has an annular configuration and includes surfaces defining a plurality of recesses which receive said bearing members, said recesses having a radial extent which is less than the radial extent of said elastomeric member, said surfaces defining said recesses being sequentially engageable with said bearing members in response to movement of said valve from the centered condition.

* * * * *